Nov. 22, 1960 L. A. COHN Re. 24,898
DENTAL SALIVA EJECTOR
Original Filed March 15, 1957
Fig. 1
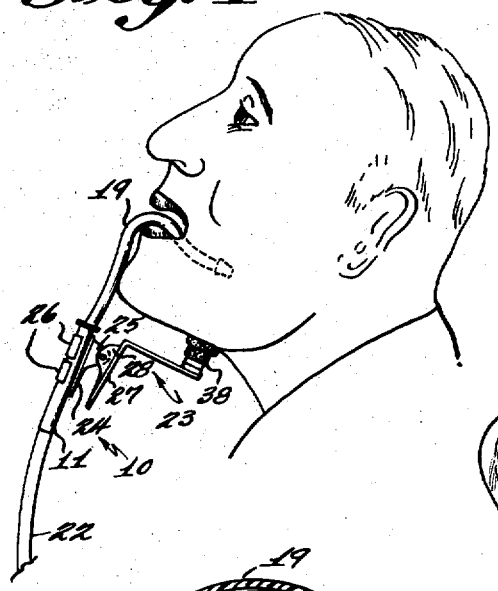
Fig. 4
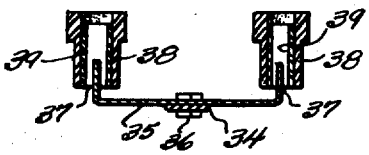
Fig. 3
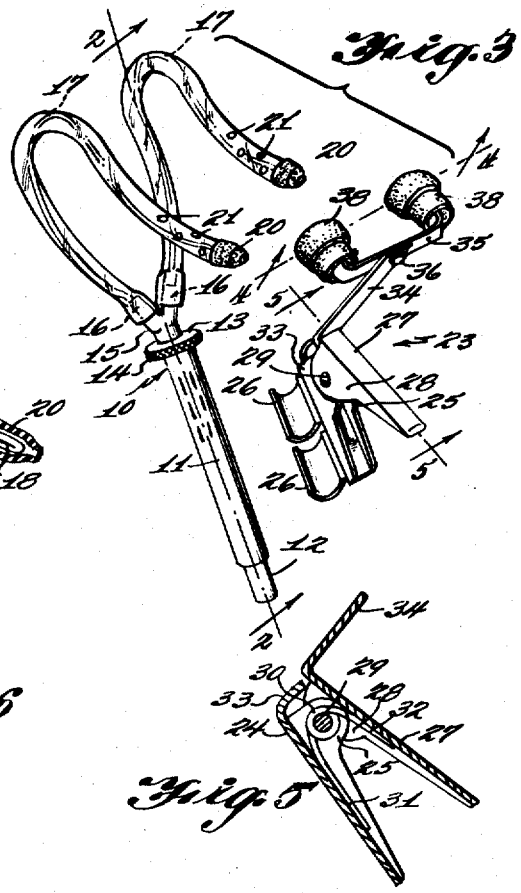
Fig. 2
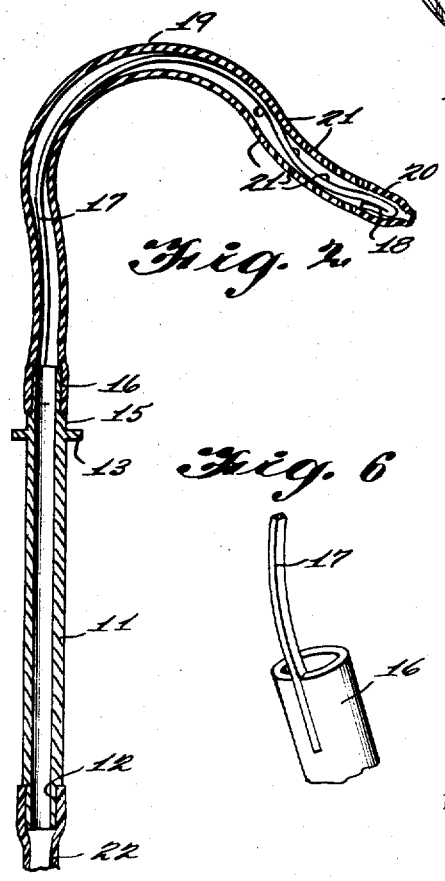
Fig. 6
Fig. 5
INVENTOR
L. A. COHN
BY Kimmel & Crowell
ATTORNEYS United States Patent Office Re. 24,898
Reissued Nov. 22, 1960

24,898

DENTAL SALIVA EJECTOR

Louis A. Cohn, Ossining, N.Y.
(654 Madison Ave., New York, N.Y.)

Original No. 2,859,518, dated Nov. 11, 1958, Ser. No. 646,307, Mar. 15, 1957. Application for reissue Feb. 24, 1959, Ser. No. 795,304

2 Claims. (Cl. 32—33)

Matter enclosed in heavy brackets [ ] appears in the original patent but forms no part of this reissue specification; matter printed in italics indicates the additions made by reissue.

The present invention relates to saliva ejectors used for maintaining a dry field during dental operations.

The primary object of the invention is to provide a saliva ejector which can be clamped in position without discomfort to the patient and without interfering with the dentist's operations.

Another object of the invention is to provide a saliva ejector of the class described above having a pair of spaced apart suction heads so that the saliva will be ejected with the head in any normal position.

A further object of the invention is to provide a saliva ejector of the class described above in which the suction head can be shaped by hand to fit the contours of the mouth of the dental patient with which it is used.

A still further object of the invention is to provide a saliva ejector of the class described above which is inexpensive to manufacture, simple and comfortable to use, and which can be readily cleansed by ordinary means and sterilized by boiling or chemical means.

Other objects and advantages will become apparent in the following specification when considered in the light of the attached drawings, in which:

Figure 1 is a side elevation of the invention shown in position on a dental patient.

Figure 2 is an enlarged fragmentary vertical cross-section taken along the line 2—2 of Figure 3, looking in the direction of the arrows.

Figure 3 is an exploded perspective view of the invention with the suction tube removed.

Figure 4 is an enlarged horizontal cross-section taken along the line 4—4 of Figure 3, looking in the direction of the arrows.

Figure 5 is an enlarged fragmentary lateral cross-section taken along the line 5—5 of Figure 3, looking in the direction of the arrows.

Figure 6 is an enlarged perspective view illustrating a construction detail of the invention.

Referring now to the drawings in detail wherein like reference characters indicate like parts throughout the several figures, the reference numeral 10 indicates generally a saliva ejector constructed in accordance with the invention.

The saliva ejector 10 comprises an elongated tubular member 11 having an externally reduced diameter end portion 12 at one end thereof and a radial flange 13 integrally formed adjacent to but spaced from the opposite end thereof. The flange 13 projects radially outwardly from the body 11 and has its annular edge [narrowed] *knurled* as at 14. The end 15 of the body 11 opposite the reduced end portion 12 is provided with a pair of diverging reduced end portions 16 projecting outwardly therefrom.

A malleable rod 17 is mounted in the side wall of the reduced end portions 16 and projects outwardly therefrom in general alignment with the axis of the end portion 16. The free end portion of the rod 17 is reverted as at 18 to form a head thereon. A plastic tube 19 is coupled to the body 11 by engagement over the reduced end portions 16 in surrounding relation to the rod 17, as best shown in Figure 2.

The plastic tube 19 is provided with a soft flexible head 20 which engages over the head 18 of the rod 17. The plastic tube 19 is perforated as at 21, for reasons to be assigned.

A clear plastic or other flexible material tube 22 is engaged over the reduced end portion 12 of the body 11 and extends to a conventional suction outlet in the dental office.

A clamp, generally indicated at 23, includes a member 24 having a pair of ears 25 extending in spaced parallel relation. A pair of spring socket members 26 are secured to the member 24 by any suitable means, such as welding or the like, and are arranged in end-to-end aligned relation. The socket members 26 are adapted to encompass the body 11, as illustrated in Figure 1, to detachably secure the member 24 thereto.

A second member 27 is provided with a pair of spaced parallel ears 28. The ears 28 extend along side of and in contact with the opposite sides of the ears 25 and are pivotally secured thereto by means of a pivot pin 29 extending therethrough. A coil spring 30 encompasses the pin 29 and has one end 31 in engagement with the member 24, and the other end 32 in engagement with the member 27.

A stop 33 is integrally formed on the member 24 at one end thereof for engagement by the member 27 at the adjacent end thereof. The coil spring 30 normally biases the members 24 and 27 so that the member 27 comes in contact with the stop 33 on the member 24. A lateral extension 34 is integrally formed on the end of the member 27 adjacent the stop 33 and extends perpendicularly thereto oppositely of the member 24.

A cross-head 35 has its medial portion secured to the outer end of the lateral extension 34 by means of a securing element 36. The cross-head 35 is provided with a pair of perpendicular lateral extensions 37 at the opposite ends thereof.

A soft tubular flexible member 38 is provided with a plastic tubular core 39 which is engaged over the lateral extensions 37 on the opposite ends of the cross-head 35 to provide a soft clamping jaw for engaging the chin of the dental patient. The plastic tube 39 frictionally engages the opposite side edges of the lateral extensions 37 to secure the member 38 thereto against accidental displacement.

In the use and operation of the invention, the rod 17 and plastic tubing 19 are shaped to fit the mouth of the patient, and the device is inserted in the patient's mouth. The clamp 23 is mounted on the body 11 by snapping the socket member 26 thereover. The clamp 23 is then adjusted by sliding the socket member 26 along the body 11 so that the members 38 engage the chin of the patient with sufficient force to hold the device in position without undue discomfort to the patient.

The tube 22 is then coupled to a suction device so as to remove the saliva from the mouth.

Having thus described the preferred embodiment of the invention, it should be understood that numerous structural modifications and adaptations may be resorted to without departing from the scope of the appended claims.

What is claimed is:

*1.* A saliva ejector comprising an elongated rigid tubular body, means detachably connecting said body to a source of vacuum, a pair of tubular reduced end portions integrally formed on one end of said body member and arranged in diverging relation, a malleable rod secured to each of said reduced end portions and extending outwardly therefrom, a plastic tube having one thereof engaged over each of said reduced end portions with said tube encompassing said malleable rod, said malleable rod having a diameter substantially smaller than the internal diameter of said tube, means on the end of said tube opposite said body for engagement with the mouth, said tube having a plurality of perforations extending therethrough adjacent the end thereof opposite said body, a chin clamp detachably secured to said body, said chin clamp including a pair of soft chin engaging members, and means normally biasing said members into contact with the chin.

*2. A saliva ejector comprising a tubular body, means detachably connecting said body to a source of vacuum, a pair of tubular conduits at one end of said body member arranged in diverging relation, a malleable rod secured to each of said conduits and extending outwardly therefrom, a plastic tube having one end thereof engaging each of said conduits, with said tube encompassing said malleable rod, said malleable rod having a diameter substantially smaller than the internal diameter of said tube, means on the end of said tube opposite said body for engagement with the mouth, said tube having a plurality of perforations extending therethrough adjacent the end thereof opposite said body, a chin clamp detachably secured to said body, said chin clamp including a pair of soft chin engaging members, and means normally biasing said members into contact with the chin.*

References Cited in the file of this patent or the original patent

UNITED STATES PATENTS

| | | |
|---|---|---|
| 1,731,322 | Riddle | Oct. 15, 1929 |
| 2,507,938 | Smith | May 16, 1950 |
| 2,519,595 | Older | Aug. 22, 1950 |
| 2,587,008 | Stadelmann | Feb. 26, 1952 |
| 2,670,539 | Wall | Mar. 2, 1954 |